Oct. 27, 1964  E. O. GOODRICH, JR  3,154,078
CATHETER COMBINATION
Filed Feb. 12, 1962
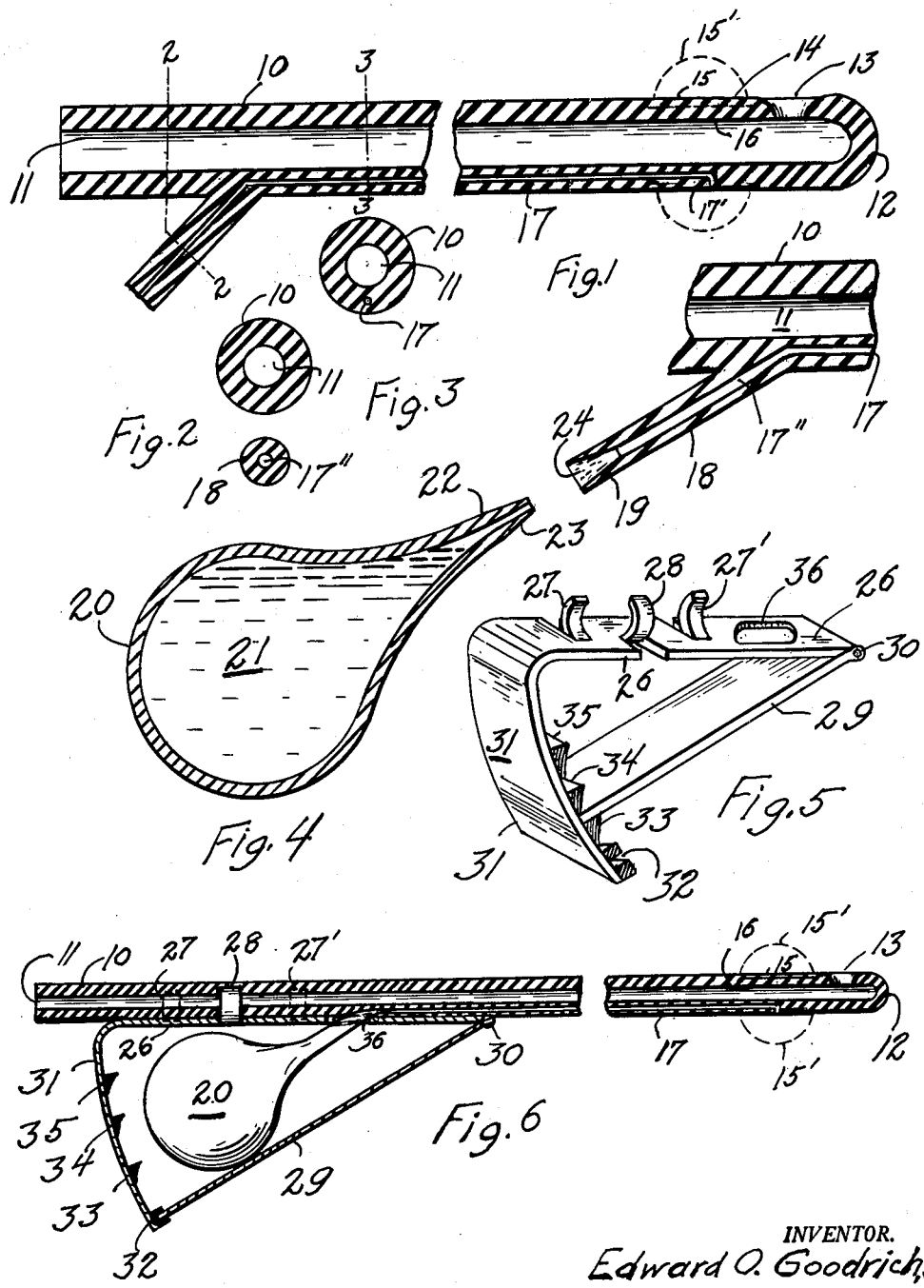
INVENTOR.
Edward O. Goodrich, Jr.
BY
Donald E. Payne United States Patent Office 3,154,078
Patented Oct. 27, 1964

3,154,078
CATHETER COMBINATION
Edward O. Goodrich, Jr., 223 E. Palace Ave.,
Santa Fe, N. Mex.
Filed Feb. 12, 1962, Ser. No. 172,488
2 Claims. (Cl. 128—348)

This invention relates to an improved catheter combination and it pertains more particularly to a unitary catheter combination having expandable and collapsible bulbs at each end securely connected with each other by a small passageway in the catheter wall.

For at least 20 years it has been known that a catheter might be held in desired functioning position by inflating a bulb, herein called a "balloon," at or adjacent to the inlet end of the catheter, said inflating being accomplished by injecting a fluid thereinto through a small passageway in the catheter wall which passageway terminates in a small inflating tube which branches from the catheter at the latter's discharge end. Since there is always the possibility that the balloon might break, great care had to be taken to be sure that the fluid was "inert," i.e., that it contained no organic or inorganic chemical, bacteria, protozoa, virus or other substance or organism which might have a toxic or an adverse effect if it were to come in direct contact with living kidney tissue or other inner part of a human body. The fluid, usually a liquid was introduced by a conventional syringe of the piston-and-cylinder type, and care had to be taken to be sure that the syringe would not contaminate the fluid, that the syringe would be loaded with precisely the right amount of fluid, that all of the liquid be delivered to the balloon without leakage and that none of the liquid escape from the balloon after it is filled. Much confusion, loss of time, and potential danger would be avoided if a catheter could be provided which did not require the use of any extraneous fluids or instrumentalities. My object is to provide such a catheter.

The catheter of my invention has a fluid-containing, squeeze-bulb syringe of rubber or rubbery material with its discharge end securely bonded to the inflating tube to form a fluid-tight connection through the small passageway to the balloon. The squeeze-bulb syringe is preloaded with the desired kind of inert fluid in the exact amount desired for the size and type of balloon employed so that the fluid is sealed into the system and cannot escape or become contaminated. Provision is made to keep the balloon from becoming inflated until the catheter is properly placed; this may be accomplished by applying a clip or clamp to the inflating tube or by employing squeeze-bulb walls of such contour, thickness and rigidity that external force has to be applied to collapse it and that when it is permitted to return to its normal contour it will suck substantially all fluid from the balloon, the walls of the latter being much thinner and more flexible than the walls of the squeeze-bulb syringe. Alternatively, the walls of the balloon may be intrinsically more tense or under greater tension than the walls of the squeeze-bulb syringe, so that in the absence of external pressure applied to the latter, e.g., by squeezing it in a clamp, substantially all fluid will be forced from the balloon to the syringe by the elastic force of the balloon walls seeking their deflated position.

When the desired amount of fluid has been transferred from the syringe to the balloon it is essential that the fluid be held in the balloon, and this I accomplish by means of a clip or clamp. The clip may be of the type conventionally used to prevent fluid flow in small rubber tubes in which case it is clamped onto the inflating tube between the syringe and the catheter. On the other hand the clip or clamp may bear against the squeeze-bulb syringe itself and such a clip may serve the three functions of (1) preventing accidental or premature squeezing of the syringe, (2) controlling or regulating the extent to which the syringe is squeezed or collapsed and thus controlling the inflation of the balloon, and (3) holding the syringe in collapsed condition and thereby preventing undesired return of fluid from the balloon to the syringe. Even if the walls of the syringe are thinner and/or intrinsically less tense than the balloon walls, fluid may be forced from the syringe into the balloon by squeezing the syringe in a properly designed clamp.

The invention will be more clearly understood from the following detailed description of a specific example thereof read in conjunction with the accompanying drawings which form a part of this specification and in which:

FIG. 1 is a section through a conventional, balloon-equipped catheter,

FIG. 2 is a vertical section on line 2—2 of FIG. 1,

FIG. 3 is a vertical section on line 3—3 of FIG. 1,

FIG. 4 is a detail section showing a fluid-filled, squeeze-bulb syringe about to be securely bonded to the inflating tube, FIG. 5 is a schematic view of a clip, and FIG. 6 is a schematic view of my improved catheter combination including the clip or clamp.

It has long been known that a catheter 10, having bore or opening 11, may be pointed or rounded at its inner or inlet end 12 adjacent which is opening 13. Body liquid entering at this opening is discharged at the opposite end of the catheter. Near opening 13 there may be a cylindrical space 14 between thin outer wall 15 and thicker wall 16. A small passageway 17 is provided in the horizontal wall of the catheter, one end thereof communicating by 17' with space 14 and the other end thereof communicating with the opening 17" in inflating tube 18, which branches off from the catheter near its discharge end. Tube 18 may be cone-shaped at its end 19. Note U.S. 2,320,157.

In accordance with my invention, a squeeze-bulb syringe 20 is filled with an inert fluid, preferably a liquid, 21 which in this example is pure, distilled water. The amount of fluid should approximate the capacity of the balloon plus the volume of the small passageway and should be carefully measured, the amount in this example being 18 ml. The walls of syringe 20 in this case are of rubber, i.e. are of the same material as that used for making the catheter. The syringe wall is, however, thicker than wall 15, and it is pear-shaped (like an ordinary ear syringe but much smaller) with a discharge end 22 of about the same diameter and bore as tube 18. The outer portion 23 of outlet 22 is tapered so that it will fit snugly into cone-shaped end 19 of tube 18. By applying a conventional rubber cement to surfaces 23 and 24 and allowing it to become tacky, the syringe may be secured or bonded to inflating tube 18 by simply pressing the two surfaces together. It is desirable, of course, that the fluid 21 be one which will not adversely affect or permeate through the walls of the syringe, passageway or balloon.

The clip or clamp employed in this example is shown in FIG. 5 and in this case it is made of stainless steel strip. A flat or base portion 26 is secured to curved walls 27, 27' and 28 which in this case are bent lugs which have been cut from the base and which are designed to fit snugly over the catheter in the vicinity of the inflating tube 18. Strip 29 is hinged to one end of base 26 at hinge 30. The other end of strip 29 bears against a curved strip 31, which is an extension of base 26 and which is stressed to always exert pressure on the free end of strip 29. A U-shaped slot 32 is designed to hold the strip in fixed outer position from which it may be disengaged by pressing strip 31 outwardly. When thus released strip 29 may be pressed toward base 26 and it may be held in various intermediate positions by ratchet teeth 33, 34, and 35. Base 26 may be provided with an opening 36 and tube 18 may be inserted therethrough before cementing the syringe on the tube, thus preventing the clip from accidentally getting separated from the catheter.

The operation of my improved catheter combination will be described by reference to FIG. 6 which shows the position of the syringe within the clip, inflating tube 18 extending through hole 36, the curved lugs 27, 27' and 28 engaging the outside wall of the catheter, and the end of strip 29 being held by slot 32 to prevent accidental squeezing of the syringe 20. An outer plastic envelope (not shown) which is sterile on its inside may encase and protect the whole assembly as catheters are protected in current practice. As soon as the unitary assembly is removed from its protective casing it is ready for immediate use without the necessity of providing any extraneous material or device. Syringe 20 is protected by strip 29, which is locked in U-shaped retainer 32, from accidental discharge. When the catheter is inserted to its desired position, curved strip 31 is flexed outwardly to permit strip 29 to be pressed toward base 26 for squeezing syringe 20 and forcing fluid 21 through passageway 17 into space 14 for forming the desired balloon. Ratchet 33 will hold the syringe in partially collapsed position and thus prevent undesired return of fluid from the balloon. At the proper time strip 29 may be pressed further until it engages ratchet 34; this further collapses or squeezes the syringe and ratchet 34 again prevents undesired return of fluid from the balloon formed by distended wall 15'. When strip 29 is held by ratchet 35 the syringe is collapsed and the balloon is fully distended. The balloon will remain distended till the curved strip 31 is moved outwardly to permit the syringe to assume its original position and thereby to suck all of the fluid out of the balloon. The catheter can then be removed, and it can be used over and over as long as the inner and outer walls of the catheter are kept or made clean and sterile.

The foregoing example is described in great detail, but it should be understood that the invention is not limited thereto or thereby. Instead of rubber I may employ any plastic material which exhibits the desired rubbery properties of elasticity and inertness and which will withstand the conditions required for sterilization. Other types of clips or clamps may be employed and the clamps may be of plastic such as polystyrene instead of steel, lugs being bent therefrom to form the ratchet teeth in either case. Instead of joining the syringe to the inflating tube with a rubber cement as above described, a midpart of inflating tube 18 may be initially fabricated with thinner or more elastic walls which may be distended by the pre-loading of inert fluid and then sealed at its outer end to form the squeeze-bulb syringe in situ. The balloon walls may be of sufficient tension to keep fluid in a more flexibly walled syringe till the catheter is in desired position at which time the fluid may be forced into the balloon and held there by a clamp substantially as above described. Other modifications and alternative structures will be apparent from the above description to those skilled in the art.

I claim:
1. In combination with a catheter having an inflatable balloon adjacent the opening at its inlet end and having a small passageway in its wall communicating with the balloon at its inner end and with an inflating tube at its outer end, a squeeze-bulb syringe of elastic material with its discharge end securely bonded to the inflating tube to form a fluid tight connection, the squeeze-bulb syringe being of such contour, thickness and rigidity that an external force must be applied to collapse it and that when it is permitted to return to its normal contour it will remove substantially all fluid from the balloon, a measured amount of inert fluid in said syringe, and a clamp around the syringe in its normal as well as its collapsed position, said clamp being constructed and arranged to include a retainer for preventing premature squeezing of the syringe, a movable strip for facilitating and controlling the squeezing of the syringe and spaced detents for holding the strip and the syringe in a selected one of several positions of partial collapse.

2. In combination with a catheter having an inflatable balloon adjacent the opening at its inlet end and having a small passageway in its wall communicating with the balloon at its inner end and with an inflating tube at its outer end, a squeeze-bulb syringe of elastic material with its discharge end securely bonded to the inflating tube to form a fluid tight connection, the squeeze-bulb syringe being of such contour, thickness and rigidity that an external force must be applied to collapse it and that when it is permitted to return to its normal contour it will remove substantially all fluid from the balloon, a measured amount of inert fluid in said syringe, and a clamp around the syringe constructed and arranged for preventing premature squeezing of the syringe, for facilitating and controlling the squeezing of the syringe and for holding the syringe in a selected one of several positions of partial collapse, said clamp having a base portion attached to the catheter adjacent the inflating tube, a strip hinged to the base portion at one end thereof, a curved strip at the other end of the base portion normally urged toward the free end of the hinged strip, the outer end of the curved strip having a retainer for engaging the free end of the hinged strip for holding it in fixed position and thus preventing the premature squeezing of the syringe, and a plurality of spaced detents on the curved strip for holding the free end of the hinged strip in positions corresponding to positions of partial collapse of said syringe.

References Cited in the file of this patent

UNITED STATES PATENTS

| | | |
|---|---|---|
| 75,693 | Morrell | Mar. 17, 1868 |
| 1,320,275 | Roach | Oct. 28, 1919 |
| 1,643,289 | Peglay | Sept. 20, 1927 |
| 3,044,468 | Birtwell | July 17, 1962 |
| 3,050,066 | Koehn | Aug. 21, 1962 |
| 3,053,257 | Birtwell | Sept. 11, 1962 |

FOREIGN PATENTS

| | | |
|---|---|---|
| 153,965 | Sweden | Apr. 3, 1956 |